UNITED STATES PATENT OFFICE.

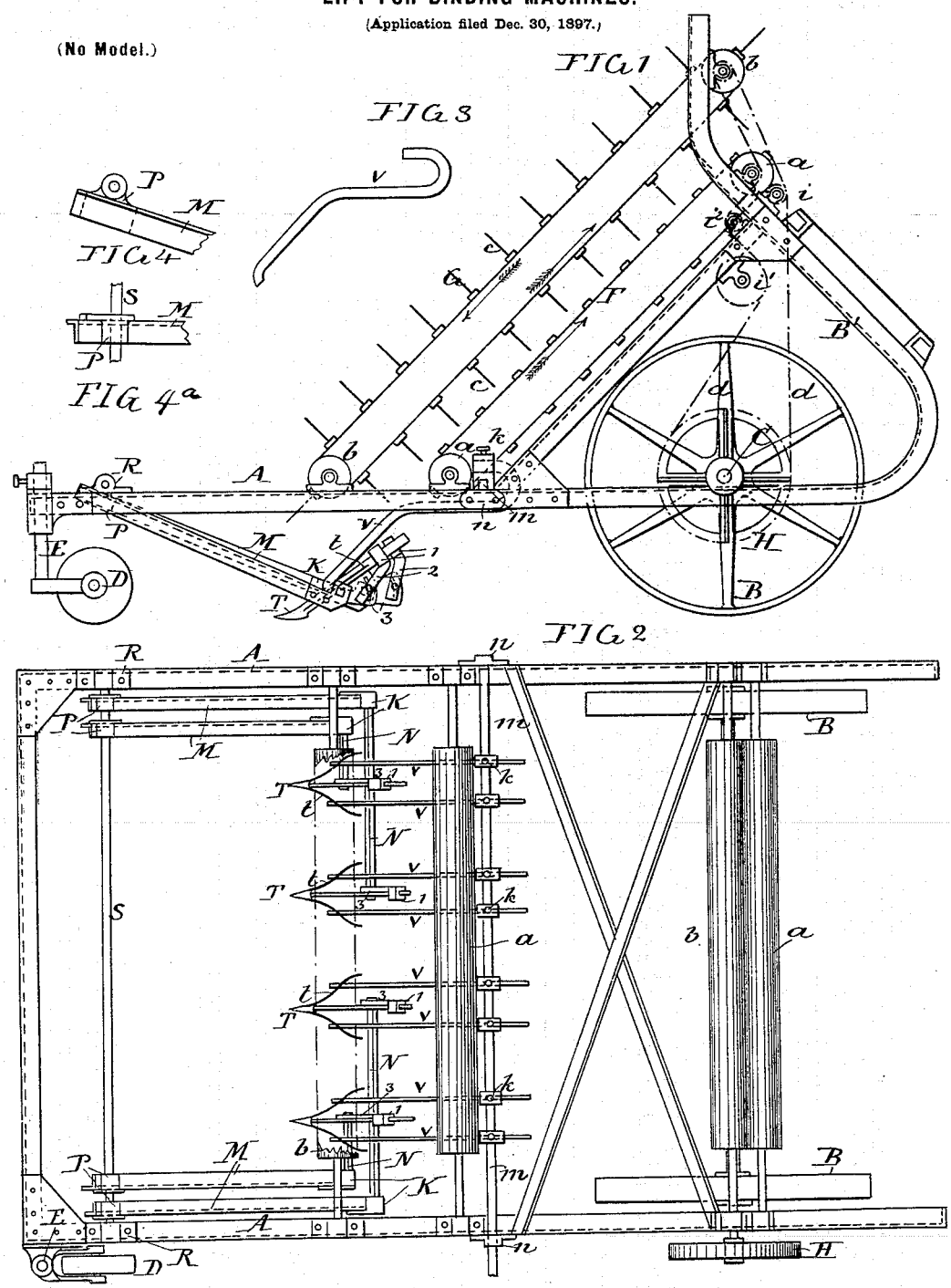

OLE JOHAN ANDREASEN, OF COPENHAGEN, DENMARK.

LIFT FOR BINDING-MACHINES.

SPECIFICATION forming part of Letters Patent No. 612,301, dated October 11, 1898.

Application filed December 30, 1897. Serial No. 664,680. (No model.)

*To all whom it may concern:*

Be it known that I, OLE JOHAN ANDREASEN, engineer, residing at Schónbergsgade, 6, Copenhagen, Denmark, have invented certain new and useful Improvements in Lifts for Binding-Machines; and I do hereby declare the following to be a full, clear, and exact description of the invention, such as will enable others skilled in the art to which it appertains to make and use the same.

This invention relates to a lift for binding-machines which by means of teeth for picking up gathers the cut crops lying in swaths, these crops being afterward by a carrying arrangement carried up to the binding-machine.

The new and characteristic features of this machine by which it differs from all hitherto known machines of the same sort consist in, first, the arrangement of a second carrying-belt lying above the common carrying-belt and provided with pikes for carrying along the crop, by which arrangement it is insured that the crop gathered by the picking-up teeth cannot accumulate on the teeth, but is immediately grasped by the carrying-pikes and carried up between the carrying-belts. By these the cut crop afterward in a completely steady and uniform manner is carried to the binding-machine. Second. The arrangement of the teeth each on its revolving arm, so that the single teeth, independent of each other, can follow the varying surface of the ground, and consequently always grasp below the crop, even where the field is very uneven. The field is thereby more completely raked than can be done by the hitherto known lifts, the picking-up teeth of which are all arranged on a common frame, so that they on a rough ground cannot grasp under the crop lying in deep or in holes of the field. Third. The arrangement of firm but adjustable guide-wires placed at the side of and on a level with or a little in front of the upper ends of the teeth for picking up, between these and the lower carrying-belt. These guide-wires are partly to prevent the crop from sliding away between the teeth, and this belt partly to prevent the upper ends of the teeth from being squeezed when the crop is passing them.

The accompanying drawings illustrate the invention, Figure 1 showing the lift in a side view. Fig. 2 shows the same seen from above, the carrying-belts being removed. Fig. 3 shows a detail view of one of the guide-wires. Fig. 4 is a side elevation of a bearing to be fully described hereinafter, and Fig. 4$^a$ is a plan view of said bearing.

The lift consists of a frame A, which is supported partly by the shaft C, having two wheels B, and partly by the two rollers or wheels D, which may revolve around the vertical shafts E. The frame A carries rollers $a$ $a$ for the common carrying-belt F and rollers $b$ $b$ for the carrying-belt G, lying above and running parallel to F, the belt G being provided with carrying-pikes $c$.

The carrying-belts in a known manner are put in motion in the direction shown by the arrows (see Fig. 1) by means of a belt $d$, which is laid around the sheave H, arranged upon the shaft C, and around the ends of the upper rollers $a$ and $b$. The belt $d$, further, is led over guide-pulleys $i'$ and $i^2$ and over a straining-roller $i$.

The two shafts E in a known manner can be adjusted in the front parts of the frame, so that the foremost part of the frame thereby may be brought closer to or farther from the surface of the ground and thereby the distance between the ground and the carrying-pikes $c$ be diminished or increased as the crop is lying in thicker or thinner layers. Instead of having two rollers D only a single one, running in one side of the frame, may be used.

The crop lying in swaths is picked up by picking-up teeth T, which are turned against the direction of movement. As soon as the crop has been lifted up on these teeth it is caught by the pikes $c$ of the upper carrying-belt and by these carried to the lower carrying-belt G, both carrying-belts then carrying the crop upward finally to drop it when the upper end of the carrying-belt F has been reached. The crop then slides along the table B' down to the binding-machine.

The picking-up teeth T, of which four are shown on the drawings, are set and screwed each one in its ring or muff 1, in which muff the tooth may be adjusted. The muff 1 is arranged upon a wire or arm 2, which by means of a bolt and nut are fastened in a shoe 3, having an arched cutting, the shoe 3 is fastened on a square shaft N, and along this shaft the shoe can be adjusted when its fasteningscrew is loosened. Thus every one of the teeth T is arranged adjustably on a square shaft N. All the outer ends of the shafts N, by means of a shoe K, are connected with the rear ends of arms M, the forward ends of which are provided with bearings P. (See Figs. 4 and 4ª.) All the pieces P are arranged loosely on the shaft S, this shaft being mounted in adjustable boxes on the frame A.

The arms M are arranged two by two on each side of the machine and the shafts N have different lengths, so that the teeth T, arranged upon these shafts, are equally dispersed over the territory the machine covers.

The teeth T can be adjusted on the square shafts N according to the length of the straw. The adjusting is made by moving the shoes 3 along the shafts.

The teeth T may have any desired shape. It is, however, preferable to provide them with two lateral branches $t\,t$, (see Fig. 2,) on which the crop slides up on the firm but adjustable guide-wires $v$, which are arranged on both sides of the movable picking-up teeth and the fronts of which are in height with or a little in front of the teeth and the upper part of which extends to the lower end of the carrying-belt F. The guide-wires above end in a horizontal arm, which is fastened into a fastening-piece $k$. All the pieces $k$ are adjustably arranged on a cross-bar $m$, fastened in mountings $n$ on the frame A.

The guide-wires, as formerly stated, are partly to prevent the crop lifted by the picking-up teeth from sliding away between the teeth and the carrying-belt and partly to prevent the upper ends of the teeth from being squeezed when the crop is passing them.

Having now particularly described and ascertained the nature of my said invention and in what manner the same is to be performed, I declare that what I claim is—

1. In an agricultural elevator, the combination of a frame, an endless carrier mounted thereon, guide-wires leading upward to the carrier, a series of arms pivoted to the frame and projecting downward and rearward therefrom into proximity with the guide-wires, and a tooth carried by each arm, the arms being independent of each other.

2. In an agricultural elevator, the combination of a frame, a series of arms pivoted thereto and projecting rearward and downward therefrom, a transverse rod carried by each arm, and a tooth adjustably mounted on each transverse rod.

3. In an agricultural elevator, the combination of a frame, a bar secured thereto, a series of guide-wires supported on said bar and running forwardly and downwardly, a shaft mounted on the frame forward of the bar, a plurality of arms pivoted to the shaft and projecting downward and rearward to the front ends of the guide-wires, and teeth carried respectively by the arms and lifting material from the ground to the guide-wires.

In testimony whereof I affix my signature in presence of two witnesses.

OLE JOHAN ANDREASEN.

Witnesses:
THEODOR HOLZ,
JULES BLOM.